United States Patent

Florjancic

[15] 3,691,913
[45] Sept. 19, 1972

[54] CLOSURE APPARATUS

[72] Inventor: Peter Florjancic, St. Martinstr. 12, 81 Garmisch-Partenkirchen, Germany

[22] Filed: June 5, 1970

[21] Appl. No.: 43,706

[30] Foreign Application Priority Data

June 10, 1969 Austria ............... A 5486/69

[52] U.S. Cl. ......................... 92/76, 92/140, 74/105
[51] Int. Cl. .......................................... F01b 1/00
[58] Field of Search ...... 92/14, 29, 76, 126, 129, 140, 92/148; 74/527, 105; 18/16, 30 LV, 30 LM, 30 LA

[56] References Cited

UNITED STATES PATENTS

| | | | |
|---|---|---|---|
| 2,897,784 | 4/1959 | Harper | 92/140 X |
| 2,634,683 | 4/1953 | Anderson | 92/140 X |
| 2,799,992 | 7/1957 | Conway | 92/140 |
| 2,951,471 | 9/1960 | Hill | 92/140 X |
| 2,989,000 | 6/1961 | Alcaro | 92/76 |
| 3,053,112 | 9/1962 | Klingler | 92/140 X |

FOREIGN PATENTS OR APPLICATIONS 1,493,473  5/1966  France ................. 18/30 LV

*Primary Examiner*—Edgar W. Geoghegan
*Assistant Examiner*—L. J. Payne
*Attorney*—Bryan, Parmelee, Johnson & Bollinger

[57] ABSTRACT

An apparatus reciprocating a working member for high pressure working at a working region such as the closure of a mold in injection molding devices and the like is described. A working member is mounted for reciprocation along a line of advancement relative to a high force producing source for high pressure working at a working region. A rigid brace is pivotly mounted alongside of the line of advancement for movement between two positions. In a first position of the rigid brace, corresponding to a closure of a mold, the rigid brace couples the force producing source to the working member for high pressure mold closure working with the rigid brace parallel to the line of advancement. In a second position of the rigid brace, corresponding to opening of the mold, the rigid brace is pivoted generally transversely to the line of advancement to enable the working member to be fully retracted. Several embodiments are shown including working member actuated rigid braces for rapid cycling of the apparatus and adjustability of mold height variations.

11 Claims, 13 Drawing Figures

PATENTED SEP 19 1972 3,691,913

INVENTOR
PETER FLORJANCIC
ATTORNEYS

INVENTOR
PETER FLORJANCIC
ATTORNEYS

CLOSURE APPARATUS

BACKGROUND OF THE INVENTION

This invention relates to an apparatus for reciprocating a working member to a working position for high pressure working. More specifically this invention relates to a closure apparatus for hydraulically actuated injection molding machines and the like.

In my co-pending patent application, Ser. No. 32,165, entitled "Closure Apparatus," filed Apr. 27, 1970, I disclosed a working member which is mounted for reciprocating movement relative to a force producing source. A rigid brace is pivoted into operative position between the force producing source and the working member when the latter has reached the working region.

SUMMARY OF THE INVENTION

In an apparatus for reciprocating a working member to a working position for high pressure working in accordance with the invention a rigid brace is pivoted over an extended angle between generally transversely disposed positions. The working member is mounted for reciprocation along a line of advancement between a force producing source and a working region to perform high pressure work such as the closing of an injection mold. The rigid brace is mounted to pivot from a first position which is parallel with the line of advancement to a second pivoted position which is generally transverse to the line of advancement. With the rigid brace in the first pivot position the force producing source and the working member are operatively coupled to one another through the rigid brace. In the second pivot position of the rigid brace the working member is retracted from the working region near the force producing source with the pivoted rigid brace therebetween to form a compact apparatus for reciprocating the working member.

In a closure apparatus utilizing a rigid brace with limited pivotal angular movement such as described in a specific embodiment in the above identified copending application, the rigid brace in its disengaged position is oriented essentially along the machine axis, i.e. the line of advancement of the working member. An advantage of the closure apparatus in accordance with the invention resides in that the overall length of the closure apparatus may be significantly reduced.

A further advantage of a closure apparatus in accordance with the invention resides in the reduction of the number of articulated joints. As a result the wear and tear on the closure apparatus are advantageously reduced and high pressures may be reliably employed to operate the working member at its working position.

In the closure apparatus specifically described in the above identified copending application the rigid brace is tilted towards the machine axis during closure and tilted to a position parallel and away from the machine axis to allow the working member to be retracted. In the closure apparatus in accordance with the invention the rigid brace is pivoted in such a way that it may be rotated by at least approximately 90 degrees. In an open position of the working member the rigid brace is oriented in a nearly radially outward direction from the line of advancement or machine axis.

When the rigid brace is pivoted into the open position, the working member, such as a closure plate, may closely approach the force producing source with an advantageous reduction in the length of the machine.

As a result of the extensive angular movement of the rigid brace, its structure includes a few joints, and rigid brace adjustments to accommodate various mold heights are simply accomplished.

In several described embodiments of the invention the rigid brace is pivoted under control by the reciprocal movement of the working member along the line of advancement. Pivot motion of the rigid brace is obtained under guidance from a cam follower and a cam surface located on the rigid brace or under guidance from flexible means such as a chain or cord. The operation of the rigid brace under action from the working member movement assures simultaneous operation with an advantageous reduction in the cycle time of the apparatus.

In another embodiment of the closure apparatus the rigid brace is mounted for pivot movement in a vertical plane. The pivotal movement of the rigid brace may then be aided by gravity.

It is, therefore, an object of the invention to provide an improved closure apparatus for injection molding devices and the like.

DESCRIPTION OF THE DRAWINGS

Other advantages and objects of the invention may be understood from the following description of various embodiments in conjunction with the drawings wherein.

DETAILED DESCRIPTION OF EMBODIMENTS

Figure 1:
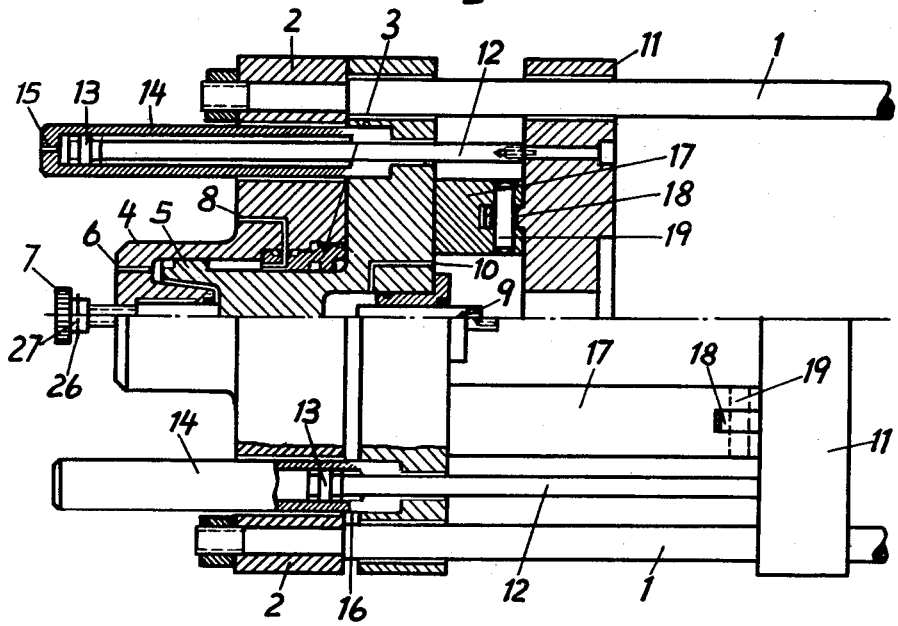
FIG. 1 is a partial horizontal section of a closure apparatus in accordance with the invention, with the upper half of the figure showing operative components in an open position, while the lower half of the figure shows these components in a closed position.

With reference to FIG. 1 a mold form (not shown) is connected to four ends of guide shafts 1 whose other ends are shown screwed onto a crosshead 2. Crosshead 2 is provided with a high pressure force producing source formed of a high pressure cylinder head 4 and a stepped piston 5 operatively located in the pressure cylinder 4 with a seal 3. A hydraulic feed line (not shown) is connected to a passage 6 to generate the compression stroke of piston 5 along the line of advancement or machine axis. Another hydraulic feed line (not shown) is connected to passage 8 to produce a return stroke for piston 5. A set screw 7 is mounted in cylinder head 4 to limit and control the return retracted position of piston 5.

The stepped piston 5 is provided with a hydraulically operated ejector 9 to which, by means of the passage 10, hydraulic pressure oil may be admitted for actuation.

A working member in the form of a closure plate 11 for an injection mold is guided by the guide shafts 1, and secured against rotation. Closing and opening motions of closure plate 11 are controlled by connecting piston rods 12 by means of a piston such as 13, located in a cylinder 14. Hydraulic oil pressure for actuation of piston 13 is applied through passages 15 and 16, respectively, for closure and opening of closure plate 11.

On the side of the closing plate 11 that is facing the stepped piston 5 two pillow blocks 18 are attached. Two rigid braces 17 are pivotly mounted to the pillow blocks 18 by means of fulcrum pins such as 19. Each rigid brace 17 has a curved cam surface 29 (see FIGS. 2 and 3) which operates together with a cam follower pin 28. The rigid brace 17 has a first pressure bearing surface area 22 at its free end, away from the fulcrum 19, and a second pressure bearing area 23 adjacent fulcrum 19. The stepped piston 5 is provided with two chamfered recesses 30 and two pressure bearing areas 31.

The closure apparatus of FIGS. 1 through 3 operates as follows. Starting from the open position, as illustrated, in FIGS. 1 and 2, the closure plate 11 is advanced to the mold for closure thereof by means of pressure oil applied through passage 15 to advance the connecting rods 12. Shortly after closure plate 11 is advanced, the cam surface 29 on rigid brace 17 encounters pin 28. As the closure plate 11 continues to advance the rigid brace 17 is lifted and its free end passes through the recesses 30 for placement opposite the stepped piston 5 when closure plate 11 has reached the closed position as shown in FIG. 3. A small space at this time remains between the facing pressure bearing surfaces 22 and 31. Hydraulic pressure oil is now supplied to passage 6 to advance the stepped piston 5 towards the closing plate 11 until the pressure bearing surfaces 23 and 22 of the rigid brace 17 firmly seat against the closure plate 11 and stepped piston 5 respectively. At this time the rigid braces 17 are parallel to the machine axis with axial locking without buckling or shearing forces.

In the described embodiment, the free end of the rigid brace 17 carries a pin 21 which is trapped behind a hook 20 attached to the stepped piston 5 when the closure plate is at its mold closing high pressure working position. In order to open the mold the stepped piston 5 is retracted by supplying hydraulic pressure oil to passage 10, and in the course of this retractive motion, pulls on the pin of the rigid brace 17 and the closure plate 11. Thus, mold opening can be performed with large forces.

Figure 2:
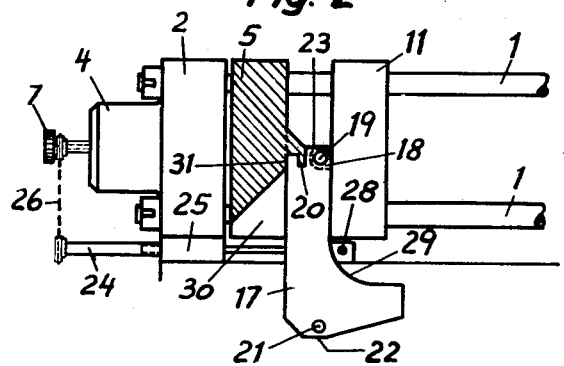
FIGS. 2 and 3 are partial vertical sections of the apparatus of FIG. 1 respectively showing an open and a closed position of the components.
Figure 3:
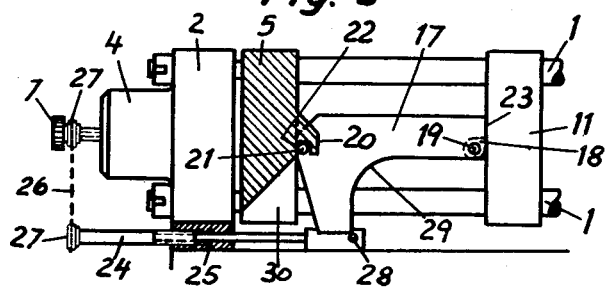

An advantageous feature of the embodiment of FIGS. 1 through 3 resides in the ability to make adjustments for mold height variations, i.e. variations in the required stroke of closure plate 11. The set screw 7 limits the retracted position of the stepped piston 5 in relation to the height of the injection mold that is closed by closure plate 11. Adjustments of set screw 7 are coordinated with the axial position of the cam follower pin 28.

In the embodiment (see FIG. 3) pin 28 sits upon a spindle 24 sliding within a fixed nut 25. Spindle 24 is rotated by the rotation of set screw 7 by means of a chain 26 and two sprocket wheels 27. Hence, axial adjustment of the stop for piston 5 introduces a corresponding axial movement of the cam follower pin 28 to assure proper pivot movement of rigid brace 17.

Instead of bolt 21 and hook 20, magnets may be attached, which at the start of the opening of the mold (retraction of closure plate 11) would effectively unite the rigid brace 17 and the piston 5 for forceful opening of the mold.

The embodiments of FIGS. 4 through 13 are schematically illustrated for ease of explanation. In the embodiment schematically illustrated in FIGS. 4 and 8 the control of the pivot motion of the rigid brace 17 is achieved in a different manner. The rigid brace 17 is pivotly connected to an arm 33 a free end of which articulates at a fixed fulcrum 32. Here too, the rigid brace 17 is swung into a closed position by the motion of the closure plate 11 with the swing being form-locked, i.e. constrained. The pivot motion of rigid brace 17 may take place in any desired plane.

Figure 4:
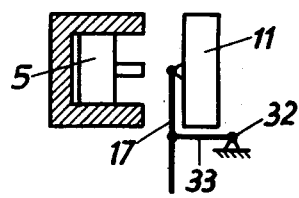
FIGS 4 through 13 are schematic illustrations of five alternate embodiments, each embodiment being schematically illustrated in closed and open positions.
Figure 5:
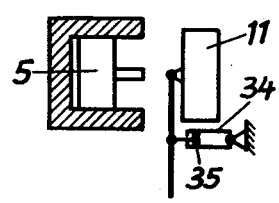
Figure 8:
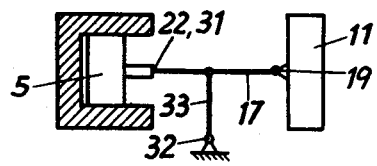
Figure 9:
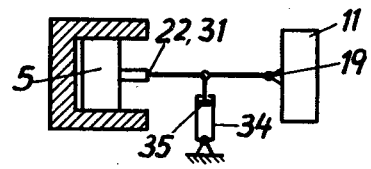

The embodiment illustrated in FIGS. 5 and 9 differs from the one shown in FIGS. 4 and 8 in the arm 33 of FIG. 4 is formed of two parts, a cylinder 34 and a piston 35 operatively seated in cylinder 34. This arrangement provides control over the speed of the rotating rigid brace 17. For instance, the rotational speed of the rigid brace 17 may be increased towards the end of the closing motion. As a result the recesses 30 in the piston may be reduced or deleted.

Figure 12:
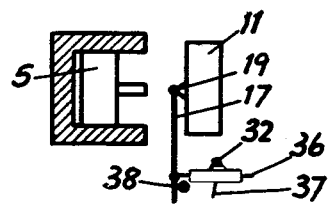
Figure 13:
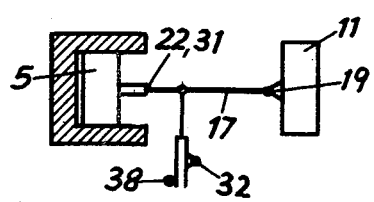

Another variant of the embodiment schematically illustrated in FIGS. 4 and 8 is schematically shown in FIGS. 12 and 13. Here too, the arm 33 consists of two parts, namely a sliding shaft 36 and a slide 37 pivoted at a fulcrum 32 on the machine frame and slidingly receiving shaft 36. A fixed stop 38 is also provided. When the closure plate 11 advances to its mold closing position the parts act in the same way described with respect to FIGS. 4 and 8 until slide 37 hits the stop 38, whereupon slide shaft 36 is rapidly pulled upwards out of the slide 37.

Figure 6:
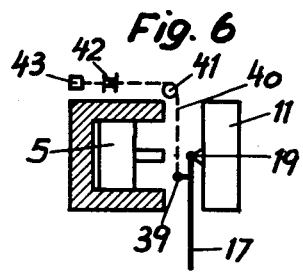
Figure 10:
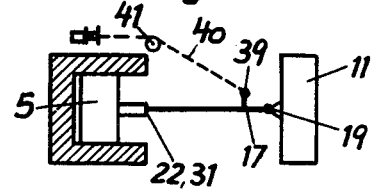

In the embodiment schematically illustrated in FIGS. 6 and 10 the rigid brace 17 has a protruding attachment 39 located between its ends for connection to flexible means such as a cord 40. The cord 40 is guided over a pulley 41 and through a sleeve 42 connected to a stop 43. At the start of the advance of closure plate 11 the rigid brace 17 is suspended until the cord 40 is tightened when the stop 43 encounters the sleeve 42. At this time the cord 40 pivots the rigid brace 17 into the closed position. A chain or a belt, or a similar flexible element can be used for a cord 40.

Figure 7:
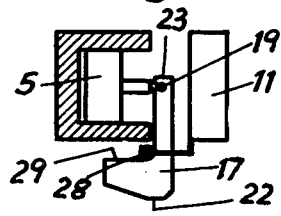
Figure 11:
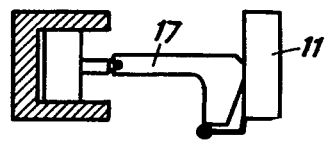

FIGS. 7 and 11 schematically show a closure apparatus in which the rigid brace 17 is pivotly mounted to the piston 5 with the cam follower pin 28 supported by the closure plate 11. The mode of operation of this embodiment corresponds to the operation described with respect to FIGS. 1, 2 and 3.

Having thus described several embodiments of an improved closure apparatus for high pressure working at working region such as encountered in injection molding devices and like, the many advantages may be appreciated.

What is claimed is:

1. An apparatus for reciprocating a working member to a working position for high pressure working such as in injection molding devices and the like, comprising a frame and a working member, said working member being mounted to the frame for reciprocal movement along a line of advancement to the working position, force producing means operatively oriented along the line of advancement to press against the working member at its working position, a rigid brace member of a length commensurate w advancement of the working member, said rigid brace member having a free end and being mounted for pivotal movement in a plane with the pivot of the rigid brace being selectively located to place the brace in a first pivot position in parallel alignment with the line of advancement and operatively seat its free end to operatively couple the force producing means with the working member and place the brace in a second pivot position generally transverse to the line of advancement to enable the working member to be retracted from its working position in proximity of the force producing means to form a compact apparatus for reciprocating the working member.

2. The apparatus for reciprocating a working member to a working position for high pressure working as claimed in claim 1 wherein said rigid brace is pivotly connected at a first fulcrum located at the reciprocating working member and pivotly connected at a second fulcrum located generally between the working member and the force producing means to bring the rigid brace into said first and second pivot positions in correspondence with the reciprocating movement of the working member.

3. The apparatus for reciprocating a working member to a working position for high pressure working as claimed in claim 2 wherein the rigid brace is provided with an arm connected thereto, one end of the rigid brace being pivotly coupled to the working member to form said first fulcrum and an end of the arm pivotly coupled at said second fulcrum.

4. The apparatus for reciprocating a working member to a working position for high pressure working as claimed in claim 3 wherein said arm further includes a piston, and a cylinder operatively enclosing the piston, said cylinder being pivotly connected at said second fulcrum.

5. The apparatus for reciprocating a working member to a working position for high pressure working as claimed in claim 3 wherein said arm includes a sleeve slidingly receiving the arm with the sleeve pivotly coupled at said second fulcrum.

6. The apparatus for reciprocating a working member to a working position for high pressure working as claimed in claim 2 and further including means for flexibly engaging said rigid brace at said second fulcrum to bring the rigid brace into said first operative position upon movement of the working member to the working position.

7. An apparatus for reciprocating a working member to a working position for high pressure working such as in injection molding devices and the like, comprising a frame and a working member, said working member being mounted to the frame for reciprocal movement along a line of advancement to the working position, force producing means operatively oriented along the line of advancement to press against the working member at its working position, a rigid brace member of a length commensurate with the advancement of the working member, said rigid brace member being mounted for pivotal movement in a plane with the pivot of the rigid brace being selectively located to place the brace in a first pivot position in parallel alignment with the line of advancement to operatively couple the force producing means with the working member and place the brace in a second pivot position generally transverse to the line of advancement, said rigid brace being provided with a cam surface oriented to move the brace between said first and second positions and a cam follower located along the line of advancement and operatively engaging the cam surface of the rigid brace to cause said brace to pivot between the first and second positions to enable the working member to be retracted from its working position in proximity of the force producing means to form a compact apparatus for reciprocating the working member.

8. The apparatus for reciprocating a working member to a working position as claimed in claim 7 wherein the rigid brace is pivotly coupled to the working member for movement between the first and second positions in correspondence with the reciprocating movement of the working member.

9. The apparatus for reciprocating a working member to a working position as claimed in claim 8 wherein said rigid brace is mounted for movement in a vertical plane with said cam surface generally oriented downwardly and with the cam follower placed below the rigid brace for contact with the cam surface.

10. The apparatus for reciprocating a working member to a working position as claimed in claim 7 and further including means for adjusting the retracted position of the working member at a desired location and means for moving the cam follower in correspondence with said adjusting means to maintain desired operative contact between the cam surface and the cam follower.

11. The apparatus for reciprocating a working member to a working position for high pressure working as claimed in claim 7 wherein said rigid brace is pivotly coupled to the force producing means and wherein said cam follower is supported by the working member.

* * * * *

UNITED STATES PATENT OFFICE
CERTIFICATE OF CORRECTION

Patent No. 3,691,913              Dated  September 19, 1972

Inventor(s) Peter Florjancic,

It is certified that error appears in the above-identified patent and that said Letters Patent are hereby corrected as shown below:

Column 5, line 4, "w" should read -- with the -- .

Signed and sealed this 1st day of May 1973.

(SEAL)
Attest:

EDWARD M. FLETCHER, JR.            ROBERT GOTTSCHALK
Attesting Officer                  Commissioner of Patents